United States Patent [19]

Eroskey et al.

[11] Patent Number: 4,678,530

[45] Date of Patent: Jul. 7, 1987

[54] METHOD OF MAKING LINER SECTIONS FOR ROTARY PULVERIZERS

[75] Inventors: Richard E. Eroskey, Munroe Falls; Larry G. Miller, Akron, both of Ohio

[73] Assignee: The B. F. Goodrich Company, Akron, Ohio

[21] Appl. No.: 795,554

[22] Filed: Nov. 6, 1985

Related U.S. Application Data

[62] Division of Ser. No. 627,245, Jul. 2, 1984, Pat. No. 4,580,734.

[51] Int. Cl.[4] ........................ B29C 63/26; B32B 31/26

[52] U.S. Cl. .................................... 156/245; 264/246; 264/247; 264/255; 264/257; 264/261; 264/271.1; 264/279

[58] Field of Search ................. 264/30, 255, 247, 246, 264/257, 261, 266, 271.1, 279, DIG. 31; 241/182; 156/245

[56] References Cited

U.S. PATENT DOCUMENTS

| | | | |
|---|---|---|---|
| 1,082,231 | 12/1913 | Nale | 264/261 X |
| 1,601,956 | 10/1926 | Gammeter | 241/102 |
| 2,210,357 | 8/1940 | Beament | 428/614 |
| 2,216,784 | 10/1940 | Payne | 29/526 R |
| 3,239,981 | 3/1966 | Fitzgerald | 428/44 |
| 4,433,128 | 2/1984 | Wick | 528/53 |
| 4,580,734 | 4/1986 | Eroskey et al. | 241/182 |

*Primary Examiner*—Jan H. Silbaugh
*Assistant Examiner*—Leo B. Tentoni
*Attorney, Agent, or Firm*—Joseph Januszkiewicz

[57] ABSTRACT

A sectional liner for use on the interior of a ball mill liner or rotary pulverizer. The sectional liner has a rubber base that is undulating or sinuate in contour. Means are provided in the rubber base to facilitate the securing of the base to the shell of a ball mill. The rubber base may or may not be covered with a layer of fiberglass which in turn is covered with an exterior surface of polyurethane. Ceramic tiles are embedded in the polyurethane being aligned in rows with a clearance space between the tiles filled with polurethane. The ceramic tiles, polyurethane, and rubber are all bonded together during the cure cycle to form a one piece replaceable sectional liner for ball mills.

4 Claims, 5 Drawing Figures

METHOD OF MAKING LINER SECTIONS FOR ROTARY PULVERIZERS

This is a division of application Ser. No. 061,627,245, filed July 2, 1984, now U.S. Pat. No. 4,580,734.

BACKGROUND OF THE INVENTION

This invention relates to rotary pulverizers known as ball mills and more particularly to the internal shell liner of such ball mills.

Such pulverizers have a rotatable cylindrical receptacle containing loose steel balls that operate on materials such as ore and the like which is loaded therein for pulverization. In certain instances the steel balls may be eliminated where the ore being worked on has sufficient physical properties that the ore itself acts as its own pulverizing agent. The rotary cylindrical receptacle generally has a rubber lining on its inner annular peripheral surface to protect it against the destructive action of the chemical in the ore and against the wearing and abrasive action of the material (ore) being worked on as well as the steel balls. The ends of the rotary cylindrical receptacle are closed by plates with rubber faces and may be provided with suitable inlet and outlet openings and doors for feeding or discharging materials therefrom. These openings may be provided on the cylindrical portion of the receptacle. The linings of the interior surface of such receptacles must be replaced as required due to their wear and accordingly, such linings are made in sections and are detachably secured to the wall to facilitate their replacement. Continuous feed type ball mills have the material introduced at one end of the rotating cylindrical shell and discharged from the other end of the cylindrical pulverizer.

The present invention is applicable to the closed end pulverizer as well as the open ended pulverizer or the continuous feed type of pulverizer. The present invention is directed to replaceable lining sections which have wearing surfaces highly resistant to abrasion to prevent premature cutting thereof and failure while having a soft tough base of resilient material to absorb the shock and impact of the material as such material is being tumbled in the cylindrical receptacle. It is an objective of the invention to provide a new and improved replaceable lining section having a wear surface with excellent wear qualities supported by a resilient yieldable base, all in a unitary construction. Such abrasive resistant liner must not be brittle but resistant to shock.

SUMMARY OF THE INVENTION

The present invention contemplates a ball mill in rotary pulverizer having a plurality of liner sections on its inner periphery that are made of a composite material. The innermost layer or base of the liner section is made from a resilient rubber material formed with an undulating outer surface. A groove is formed into the base to provide means for connecting the liner to the shell of the ball mill. A steel channel is positioned into the groove to enhance the strength of the groove. The rubber base may or may not be covered with a layer of fiberglass with an exterior surface of polyurethane with ceramic tiles embedded therein. The clearance space between the ceramic tiles and around the exterior sides of the tiles is filled with a polyurethane material. Where the fiberglass layer is used, it connects the ceramic tiles and the polyurethane layer to the rubber base otherwise the polyurethane layer is bonded to rubber.

DETAILED DESCRIPTION

Figure 1:
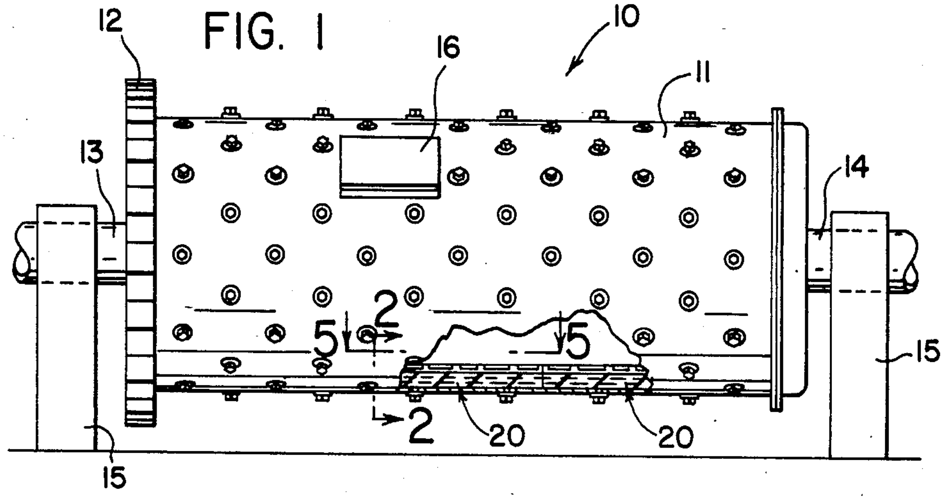
FIG. 1 is a diagrammatic side elevational view, partly in longitudinal section of a ball mill or rotary pulverizer.
Figure 4:
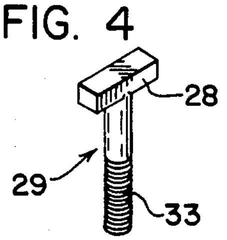
FIG. 4 is a perspective view of a bolt suitable for use with the groove in the liner section of the ball mill.

Referring now to the drawings, wherein like reference numerals designate like or corresponding parts throughout the several views, there is shown in FIG. 1 a rotary pulverizer or ball mill 10 having a cylindrical receptacle or shell 11 encompassed at one end by a ring gear 12 connected to a suitable drive means not shown but old and well known in the art. The cylindrical receptacle 11 has end portions or end walls supported by end bearings 13 and 14 suitably journaled on supports 15. An access door 16 is provided on the cylindrical shell 11 to provide means for introducing materials into the receptacle to be pulverized as well as for introducing grinding elements into the receptacle. The same door 16 or other exit means may also be used for removing the ground material from the ball mill 10. In lieu of using door 16 for loading and unloading the materials to the pulverizer, such pulverizer may be of the continuous feed type, wherein both ends of the cylindrical shell 11 may be open whereby material is introduced into one end of the cylindrical shell and removed from the other end thereof to provide a continuous flow.

Figure 3:
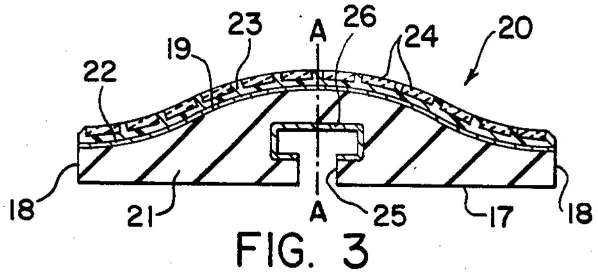
FIG. 3 is a cross-sectional view of a liner section shown in relaxed condition prior to mounting in a ball mill.
Figure 5:
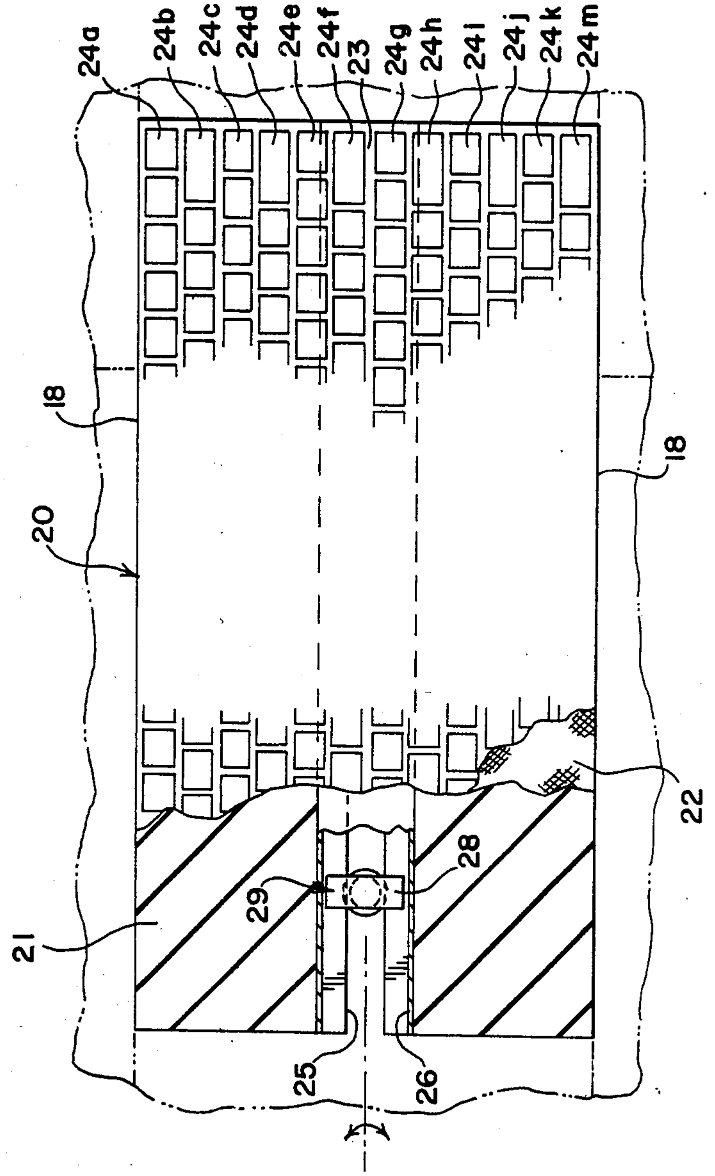
FIG. 5 is a top plan view of a liner section taken on line 5—5 of FIG. 1 with different layers being partly broken away and with the liner section flattened to more fully disclose the relative positions of the ceramic tiles.

The cylindrical shell or receptacle 11 is provided with a plurality of liner sections 20 having a rectangular shaped base portion 21 with a flat planar surface 17 (FIG. 3). The base portion 21 has parallel sides 18 and a centerline A—A midway therebetween. The sides 18 may be beveled at the upper ends adjacent to the outer edges of the ceramic tiles to be described as shown in FIG. 3. The liner sections 20 are made from resilient flexible rubber material. In cross sec:tion, the rubber base portion 21 is sinuate in contour presenting an undulating upper surface 19 with the crest at the centerline A—A and the lowest portion or trough at the respective sides 18 when any pair of liner sections 20 are attached to the cylindrical shell of a ball mill. A thin uniform layer of fiberglass 22 is bonded to the upper surface of the respective individual base portions 21. A layer of polyurethane 23 is suitably bonded to the layer of fiberglass 22. A plurality of rows of thin ceramic tile members 24 are adhered to the polyurethane layer in aligned rows. In FIG. 5, the first row of tiles are designated **24*a*, the second row of tiles are designated 24*b*, the third row of tiles are designated 24*c* and so on with tiles 24*m* being located adjacent one of the parallel sides of the liner section 20. Preferably the tiles in each row are staggered relative to tiles in adjacent rows providing clearance spaces between all adjacent tiles, which clearance space is filled with a polyurethane material which is integral with the polyurethane layer 23. The upper or outer surface of the polyurethane material provides an abrasive resistant surface along with the ceramic tile members. When cast the ceramic tiles are encompassed by the polyurethane material. The ceramic tiles members 24 and abrasive resistant polyurethane material is connected to the rubber base 21 by the fiberglass layer 22. As an alternative the fiberglass layer 22 may be omitted and the ceramic tiles 24 and polyurethane layer 23 is bonded as by cement or a suitable adhesive, which is old and well known in the art, to the rubber base 21. This is achieved by first laying out the ceramic blocks or tiles 24 onto the bottom portion of a mold such that the tiles are laid out in rows. The tiles 24 in each row may be staggered relative to those in adjacent rows. The tiles as so laid out have a clearance space around them relative to adjacent tiles. Liquid cast polyurethane is then poured over the ceramic tiles, filling the clearance spaces and of sufficient depth to provide a thin layer 23 of polyurethane. Such layer of ceramic tile and the layer of polyurethane is cured to form a slab. Curing is obtained by heating the polyurethane to between 200° F. (93.33° C.) and 250° F. (121.11° C.) to form such integral slab. The polyurethane can have a thickness, exclusive of the ceramic tiles of from 1/6 of an inch (0.1587 cm) to $\frac{3}{4}$ of an inch (1.905 cm). The slab after cure is then positioned into a second mold over a layer of rubber therein. The slab and rubber is then shaped to contour the rubber into a concave form with the ceramic tiles and polyurethane forming a thin layer that conforms to the concave outer surface of entire composite section as seen in FIG. 3, wherein the bottom surface of the liner section 20** is flat.

Figure 2:
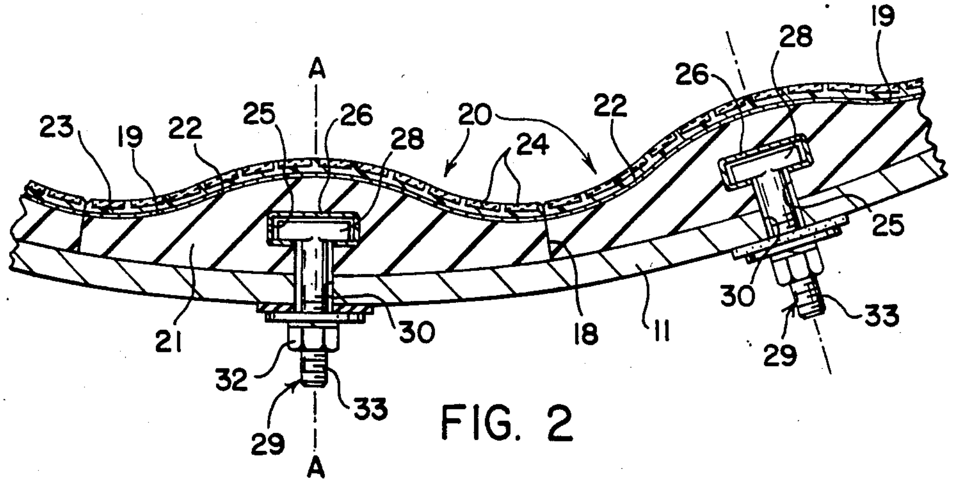
FIG. 2 is an enlarged fragmentary sectional view of portions of liner sections as attached to the wall of a cylindrical receptacle of a ball mill taken on line 2—2 of FIG. 1.

In the modification wherein a fiberglass layer is interposed between the polyurethane layer and the rubber, the procedure is essentially the same as described above wherein the slab is first formed containing the ceramic tile embedded in the layer 23 of the polyurethane. This slab is then placed into a second mold. A suitable adhesive is applied to the polyurethane surface of the slab and then the fiberglass layer 22 is applied thereover. A coating of adhesive is then applied over the fiberglass layer 22. The rubber layer is then positioned over the adhesive coated fiberglass layer 22 afterwhich the composite section is shaped and cured to form the liner section 20 as seen in FIG. 2. During such final shaping and cure, the fiberglass layer facilitates the bonding of the polyurethane to the rubber base 21.

A T-shaped groove 25 is formed centrally into the rubber base portion 21 along the center line A—A of each liner section. A steel channel 26 is positioned into the lateral portions of the T-shaped groove 25, which is also that portion of the groove that is adapted to receive the head 28 of a T-shaped bolt 29. The head 28 of bolt 29 has a flat, elongated head which is passed through apertures 30 in the shell 11, and through the stem portion of the T-shaped groove 25, and is then given a quarter turn to the position shown in FIG. 2. A nut 32 is threaded onto the threaded stem 33 of bolt 29 to secure the liner sections 20 into the cylindrical shell 11. In the final cure cycle the ceramic tiles, the polyurethane material, with or without the fiberglass layer, rubber and steel channel are all bonded together to form a one piece integral liner section. With the final curing of the liner section 20 in the flat condition as shown in FIG. 3, the amount of actual curvature given to the liner section 20 in a cylindrical shell is facilitated by the fact that the liner sections can be bent to any desired radius thus conforming to the shape of the cylindrical shell.

Various modifications are contemplated and may obviously be resorted to by those skilled in the art without departing from the described invention, as hereinafter defined by the appended claims, as only a preferred embodiment thereof has been disclosed.

We claim:

1. A method of making a liner section for use in a rotary pulverizer comprising the steps of positioning a plurality of flat ceramic tiles onto the bottom surface in a mold with clearance spaces between the respective tiles, pouring liquid cast polyurethane into the mold to fill said clearance spaces and provide a layer of polyurethane above said tiles to form a slab, curing said slab, positioning said slab into a second mold having a layer of rubber therein, molding said slab and said layer of rubber to shape said rubber layer into a concave form, and curing said slab and said layer of rubber into an integral unit.

2. A method of making a liner section as set forth in claim 1 wherein said curing of said slab and said layer of rubber into an integral unit conforms said ceramic tiles and layer of polyurethane into a concave contour.

3. A method of making a liner section as set forth in claim 2 wherein said layer of rubber is cemented to said slab.

4. A method of making a liner section as set forth in claim 3 wherein said slab has a layer of fiberglass interposed between said slab and said rubber prior to the molding of said slab and said layer of rubber to shape said rubber layer.

* * * * *